United States Patent [19]

Fowler

[11] Patent Number: 5,101,666
[45] Date of Patent: Apr. 7, 1992

[54] APPARATUS FOR DETECTING CHANGE OF PRESSURE IN TUBES

[76] Inventor: Don P. Fowler, 13403 SE. 171st Pl., Renton, Wash. 98058

[21] Appl. No.: 518,421

[22] Filed: May 3, 1990

[51] Int. Cl.$^5$ .............................................. G01L 7/00
[52] U.S. Cl. ........................................ 73/730; 73/756
[58] Field of Search ...................... 73/730, 119 A, 728, 73/753, 756; 336/30

[56] References Cited

U.S. PATENT DOCUMENTS

| | | | |
|---|---|---|---|
| 1,921,001 | 8/1933 | Ohlson | 73/730 |
| 3,698,248 | 10/1972 | Vasek | 73/730 |
| 3,698,249 | 10/1972 | Weaver | 73/730 |
| 4,702,675 | 10/1987 | Aldrovandi | 73/730 |

Primary Examiner—Donald O. Woodiel
Attorney, Agent, or Firm—Robert W. Jenny

[57] ABSTRACT

The subject apparatus enables detecting changes in pressure of the fluid in a conduit from outside the conduit without disturbing the conduit or its function. The detection is made by sensing changes in diameter of the conduit caused by pressure changes, using a linear measurement electrical transducer. The transducer is mounted in a cylindrical sleeve which telescopes in a second sleeve which is externally threaded at both ends. A fixture is threaded onto one end with the sensing probe of the transducer extending through a hole in the fixture. An auxilliary sleeve is installed between the transducer support sleeve and the fixture, and also extends through the fixture and is forced toward the fixture by a compression spring between the transducer sleeve and auxilliary sleeve. A knurled knob is threaded onto the second sleeve and is used to adjust the position of the transducer along the axis of the sleeve. A saddle is detachably attached to the fixture with the conduit between the saddle and the auxilliary sleeve. The knurled knob is then adjusted to bring the probe of the transducer into contact with the conduit and set its output signal at a desired value.

The spring loaded contact between the conduit and saddle and auxilliary sleeve stabilize the apparatus on the conduit. A variety of fixtures and saddles are provided to adapt the apparatus for use on conduits in a range of diameters while keeping the apparatus as compact as feasible.

1 Claim, 2 Drawing Sheets

APPARATUS FOR DETECTING CHANGE OF PRESSURE IN TUBES

BACKGROUND OF THE INVENTION

1. Field

The apparatus is in the field of apparatus for sensing and measuring pressure in closed containers, specifically tubes and pipes. More specifically it is in the field of such apparatus which is used externally to the containers, pipes and tubes and, still more specifically, the field is limited to apparatus which detects changes in pressure in a particular tube containing fluid under pressure.

2. Prior Art

The patents listed below constitute a sampling of the prior art in the specific field.

| | |
|---|---|
| 3,163,529 | 4,290,311 |
| 3,603,152 | 4,321,833 |
| 3,898,885 | 4,391,147 |
| 3,965,745 | 4,404,854 |
| 4,174,637 | 4,646,563 |
| Japanese: 55-96432(A) | |

In addition there is commercially available prior art apparatus not known to be patented. A diligent, comprehensive review of the commercially available prior art and a preliminary search of patented prior art did not lead to apparatus which solved the problem addressed by the subject invention. That problem was the need to quickly and easily detect changes in pressure in any particular tube in a cluster of tubes. An example of such a cluster of tubes is the tubing exposed in the wheel well of a modern commercial airplane. Analyzing (i.e. troubleshooting) the hydraulic systems which the tubing serve is greatly facilitated by being able to detect which tubes are pressurized or not without disrupting the function of the tubing or the systems they serve. Therefore, the prime objective of the subject invention was to provide apparatus which can detect changes in pressure of the fluid in a conduit without interfering with the function of the conduit. Other objectives were that the apparatus be compact and usable on any one of a cluster of conduits; i.e. be able, for example, to fit onto one tube mounted close to one or more other tubes and in a range of diameters. Another objective was that the apparatus be mechanically self-supporting once it is installed on a conduit.

SUMMARY OF THE INVENTION

The subject apparatus is used to detect pressure changes in the fluid in a pipe or tube (i.e. conduit) and to do so from outside the conduit. No disassembly or modification of the conduit is needed and the conduit may be in use while the detection is made. The pressurization is detected by detecting changes of the outside diameter of the conduit caused by increases and decreases of the fluid pressure in the conduit. The changes in diameter are detected by a commercially available electromechanical transducer known in the art as a Linear Variable Differential Transformer (LVDT). LVDT's able to make reliable, accurate measurements with a resolution of a millionth of an inch are now commercially available, making the subject apparatus useful with small changes of pressure in the conduit.

The LVDT has a slender cylindrical configuration with an electrical conductor extending from one end and a spring loaded plunger extending from the other. Axial motion of the plunger changes the output signal of the LVDT.

The apparatus comprises a cylindrical outer sleeve threaded at both ends of its outside surface. The threads at one end are engaged by an internally threaded, klurled knob. The threads at the other end engage an internally threaded fixture which supports a part called a saddle which bridges the end of the sleeve. The saddle is readily detachable from and attachable to the fixture.

The LVDT is mounted in a second inner sleeve which telescopes inside the outer sleeve and is held in the outer sleeve by the knob. A compression spring rests on a step on the inner sleeve and supports an auxilliary inner sleeve which surrounds the plunger end and plunger of the LVDT.

In use the saddle is detached from the apparatus and positioned against one side of a conduit to be tested and the rest of the apparatus is positioned endwise against the conduit opposite the saddle and reattached to the saddle. At this point the conduit is clamped between the saddle and the end of the auxilliary sleeve under spring load from the compression spring. The knurled knob is then turned to move the inner sleeve and LVDT mounted in it toward the conduit until the plunger contacts the conduit and is moved to produce a desired base reading of the output signal from the LVDT. Changes in pressure in the conduit will change the diameter of the conduit and move the auxilliary sleeve and plunger in unison, causing a change in the signal from the LVDT, the signal change being proportional to the diameter change.

The spring loading of the auxilliary sleeve against the conduit and the conduit against the saddle inherently stabilizes the apparatus on the conduit so that it need not be held manually once it is installed. A variety of fixtures and saddles are available and interchangeable on the apparatus to adapt it to a range of conduit sizes while keeping the fixture and saddle as compact as feasible for each conduit diameter, thus facilitating use of the apparatus in clusters of tubing such as those found in commercial aircraft.

The invention is described in more detail below with reference to the attached drawings.

DETAILED DESCRIPTION OF THE INVENTION

Figure 1:
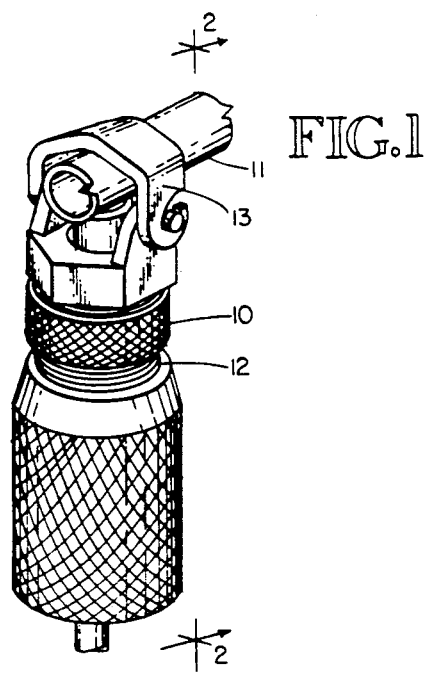
FIG. 1 is a perspective, approximately full scale view of a preferred embodiment of the invention attached onto a conduit.

The subject invention is apparatus which detects, from outside a conduit, variations in pressure of the fluid within the conduit. A preferred embodiment of the invention is shown, approximately full scale, in FIG. 1. The apparatus 10 is shown attached to conduit 11 and comprises body assembly 12 and saddle 13. The apparatus is shown in more detail in FIG. 2, an enlarged sectional view taken at 2—2 in FIG. 1, and FIG. 3 a view taken from 3—3 in FIG. 2. Sleeve 14 is externally threaded at both ends 15 and 16. Knurled knob 17 is threaded onto end 16 and fixture 18 is threaded onto end 15 and tightened into place with shoulder 19 against shoulder 20 of sleeve 14. Saddle 13 is detachably attached to fixture 18 by pins 21 and 21' which engage slots in the saddle, slot 22 being typical and visible in FIG. 3.

LVDT 23 is threaded into bore 24 of inner sleeve 25 which telescopes into bore 26 of sleeve 14 and is kept from rotating relative to sleeve 14 by the engagement of pin 27 in keyway 28. Auxilliary sleeve 29 also fits telescopically into sleeve 14 and surrounds end 30 and plunger 31 of the LVDT. Compression spring 32 urges inner sleeve 25 and auxilliary sleeve 29 apart, the movement of sleeve 29 being limited by contact of shoulder 33 on sleeve 29 and shoulder 20 on sleeve 14.

Figure 2:
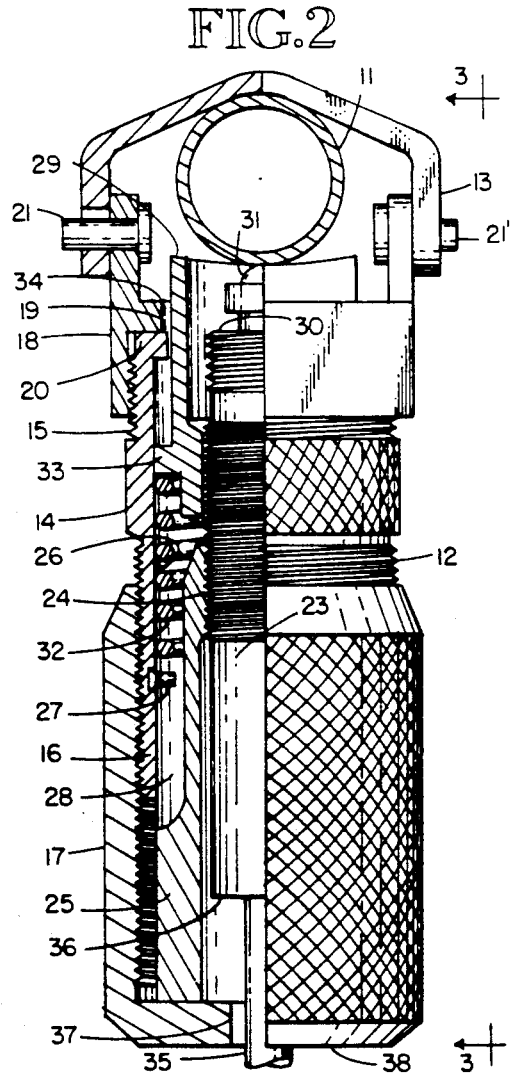
FIG. 2 is an enlarged sectional view of the subject apparatus taken at 2—2 in FIG. 1.
Figure 3:
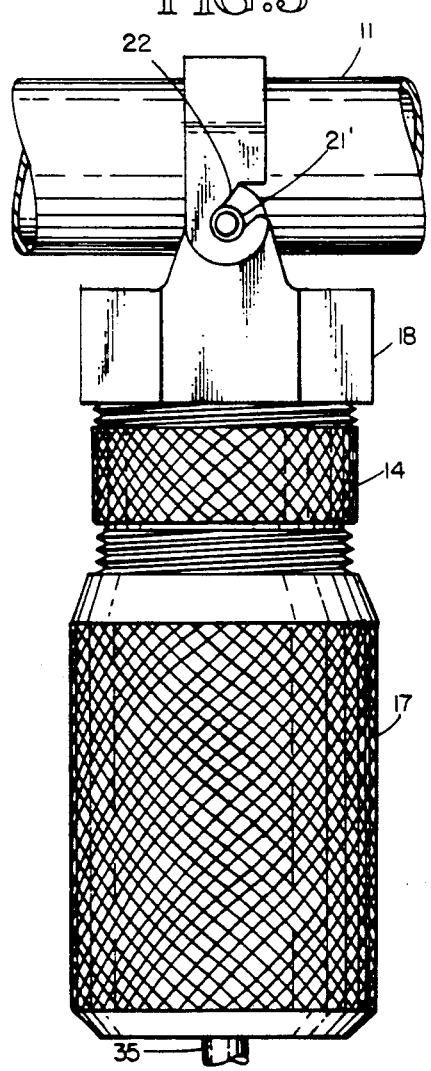
FIG. 3 is an enlarged view of the subject apparatus taken from 3—3 in FIG. 2.

Sleeve 29 extends through hole 34 in fixture 18 and is shown in FIGS. 2 and 3 contacting conduit 11 which is filled with fluid. Plunger 31 of the LVDT is also contacting the conduit under force applied by a spring in the LVDT.

Electrical conductor 35 extends from end 36 of the LDVT, passes through hole 37 in end 38 of knob 17 and carries electrical power to the LVDT and electrical signals from it.

FIGS. 4, 4A, 4B and 4C are schematic half sections of the apparatus and illustrate its use. In these FIGS., for reference purposes the position of sleeve 14 is not changed from FIG. to FIG. In FIG. 4 the saddle 13 is detached from the remainder of the apparatus and positioned on the upper (in this view) side of a conduit 11. Knob 17 has been adjusted so that spring 32 is extended but shoulder 33 on auxillary sleeve 29 is in contact with shoulder 20 on sleeve 14. This adjustment assures that plunger 31 of the LVDT is well protected by sleeve 29 and will not contact the conduit until such contact Is Intended.

Figure 4:
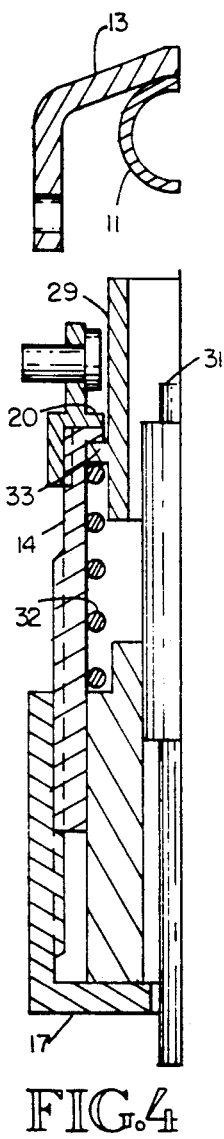
FIGS. 4, 4A, 4B and 4C are schematic sectional views, similar to FIG. 2, illustrating the operation of the apparatus.
Figure 4A:
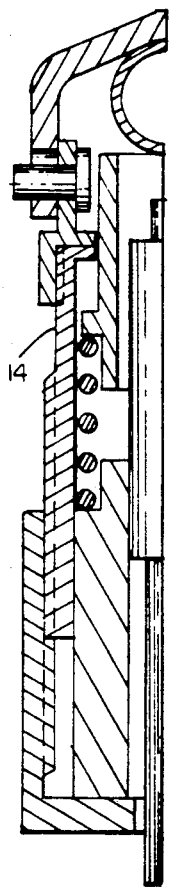

In FIG. 4A the saddle is reattached to the remainder of the apparatus, and extends around the conduit, contacting the conduit at at least one point essentially diametrically opposite the point of contact of plunger 31 with the conduit. The auxilliary sleeve has moved to accommodate the conduit, compressing the spring. In this situation the apparatus is self-supported on the conduit.

Figure 4B:
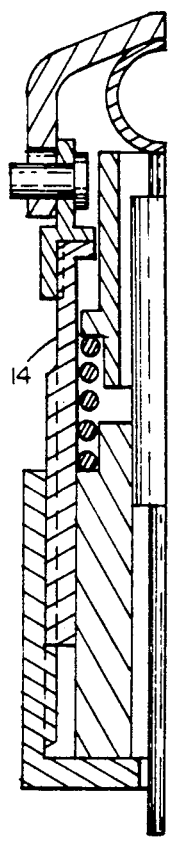

In FIG. 4B knob 17 has been adjusted to bring plunger 31 into contact with the conduit at a point opposite the points of contact between the saddle and the conduit. This adjustment also serves to bring the output signal from the LVDT to a desired reference value.

Figure 4C:
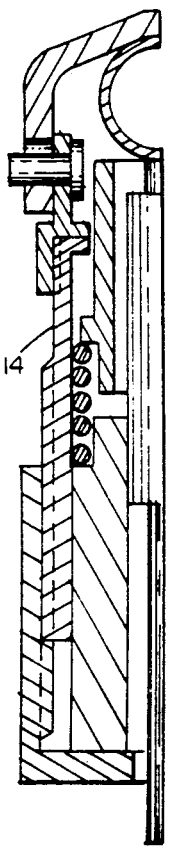

In FIG. 4C the conduit is shown enlarged to an exaggerated extent by an increase in pressure of the fluid in the conduit. This change in dimension has moved the auxilliary sleeve and plunger. The plunger movement causes a deviation in the LVDT output signal away from the reference value, indicating that a pressure change has taken place in the conduit. If the pressure of the fluid had decreased the conduit diameter would have decreased, the auxilliary sleeve and plunger would have moved in the direction opposite to the direction indicated and a pressure change would have been indicated in this situation also.

It is considered clear from this disclosure that the subject invention meets its objectives. It provides apparatus which detects changes in pressure in a conduit without interfering with the function of the conduit. The apparatus is compact and therefore usable on any one of a cluster of conduits. The interchangeability of fixtures and saddles extends this usefulness to clusters of conduits having various diameters. Also, once installed, the apparatus is self-supporting.

It is also considered understandable that while a preferred embodiment of the invention is disclosed herein, other embodiments and modifications of the one disclosed are possible within the scope of the invention which is limited only by the attached claims.

I claim:

1. Apparatus for detecting changes in the pressure of the fluid in a conduit having a diameter, said apparatus comprising:

a linear motion sensing transducer having a plunger, adjustable means for clamping said apparatus onto said conduit, adjustable means for mounting said transducer in said apparatus, means for adjusting both said means for clamping and said means for mounting, whereby when said apparatus is clamped onto said conduit and said adjustable means for mounting said transducer is adjusted by said means for adjusting to put said plunger in contact with said conduit at a first contact point and said pressure of said fluid in said conduit changes, causing said diameter to change, said plunger moves, providing detection of said change in said pressure, said apparatus further comprising a first cylindrical sleeve having a bore, a first end and a second end, said first cylindrical sleeve being externally threaded on said first and second ends, said adjustable means for mounting said transducer comprising a second cylindrical sleeve having a bore, said transducer being mounted in said second bore, said second sleeve being installed in said first bore at said second end, said adjustable means for clamping said apparatus comprising an auxilliary sleeve in said first bore at said first end, a compression spring in said first bore between said second sleeve and said auxilliary sleeve, a fixture threadably attached to said first end and a saddle detachable attached to said fixture, said saddle extending around said conduit and contacting it at at least one second contact point essentially diametrically opposite to said first contact point, said means for adjusting comprising an internally threaded knob threaded onto said second end of said first sleeve and contacting said cylindrical sleeve, whereby when said knob is turned it adjusts both the axial location of said transducer in said apparatus and said spring and said auxilliary sleeve of said clamping means.

* * * * *